(12) United States Patent  (10) Patent No.: US 7,422,323 B2
Saitoh et al.  (45) Date of Patent: Sep. 9, 2008

(54) HINGE SYSTEM FOR EYEWEAR

(75) Inventors: Masatoshi Saitoh, Saitama (JP); Tohru Negishi, Saitama (JP)

(73) Assignee: Washin Optical Co., Ltd., Tokyo (JP)

( * ) Notice: Subject to any disclaimer, the term of this patent is extended or adjusted under 35 U.S.C. 154(b) by 67 days.

(21) Appl. No.: 11/809,229

(22) Filed: May 31, 2007

(65) Prior Publication Data
US 2007/0285614 A1    Dec. 13, 2007

(30) Foreign Application Priority Data
Jun. 9, 2006  (JP)  ............... 2006-161519

(51) Int. Cl.
G02C 5/22  (2006.01)
(52) U.S. Cl. ........................ 351/153; 16/228
(58) Field of Classification Search ................ 351/153, 351/140, 111, 41, 158; 16/228
See application file for complete search history.

(56) References Cited

U.S. PATENT DOCUMENTS

| | | | |
|---|---|---|---|
| 3,145,254 A | | 8/1964 | McCulloch |
| 3,422,449 A | * | 1/1969 | Rinnman .................... 351/121 |
| 3,654,376 A | | 4/1972 | Lyons, Sr. |
| 5,321,442 A | * | 6/1994 | Albanese .................... 351/44 |
| 5,682,222 A | | 10/1997 | Chao |
| 6,217,170 B1 | * | 4/2001 | Hsiao ........................ 351/153 |
| 2007/0146626 A1 | | 6/2007 | Rossin |

FOREIGN PATENT DOCUMENTS

| | | |
|---|---|---|
| DE | 41 22 966 C 1 | 6/1992 |
| DE | 198 35 197 C1 | 11/1999 |
| EP | 0 632 305 A1 | 1/1995 |
| JP | 2945656 | 6/1999 |
| JP | 2000-010052 | 1/2000 |
| JP | 2001-255497 | 9/2001 |
| JP | 2004-109841 | 4/2004 |
| WO | WO 2004/066019 A1 | 8/2004 |

* cited by examiner

*Primary Examiner*—Hung X. Dang
(74) *Attorney, Agent, or Firm*—Carrier, Blackman & Associates, P.C.; Joseph P. Carrier; William D. Blackman

(57) ABSTRACT

A hinge system for eyewear includes a pivotable hinge element for connecting a temple to a lug on each end of a lens frame. The pivotable hinge element has one end pivotably connected to the lug and the other end arranged to allow the temple to be pivotably moved between a wearing position and a folded position. First and second magnets are provided in the lug and the pivotable hinge element, respectively. The first and second magnets have respective confronting surfaces oriented to face against each other when the temple is in its wearing position. The confronting surfaces of the first and second magnets have an identical polarity, so that the first and second magnets are operatively associated to urge the temple inwardly toward its folded position when the temple is moved to its wearing position.

9 Claims, 3 Drawing Sheets

HINGE SYSTEM FOR EYEWEAR

FIELD OF THE INVENTION

The present invention generally relates to eyewear and more particularly, to an eyewear hinge system for urging temples inwardly against the head of a wearer for comfortable and secured fit.

BACKGROUND OF THE INVENTION

A common annoyance with conventional eyewear frames is that the frames slip along the nose of a wearer after a prolonged period of use. This is caused, for example, by spreading of temples.

Attempts have heretofore been made to incorporate means for applying a suitable amount of temple pressure on the head of a wearer to provide a comfortable and secured fit. Many of such means rely on leaf springs disposed on hinges between a lens frame and temples so as to urge the temples toward their folded or closed position. For example, U.S. Pat. No. 3,145,254 discloses a spring connection between a lens frame and each temple. The spring connection includes a U-shaped leaf spring disposed in each lateral end of the lens frame, and a temple insert disposed in one end of the temple and having an eccentric bifurcated portion. The eccentric bifurcated portion of the temple insert and the leaf spring are operatively associated to urge the temple against the head of a wearer. U.S. Pat. No. 3,654,376 discloses pressure means attached to each temple. The pressure means includes a resilient body snugly fit over one end of the temple, and an elongated resilient flat spring extending from the resilient body. The flat spring is engaged with each lateral end of the lens frame to exert a pressure on the temple to urge it toward its closed position.

A problem with the leaf springs is that repeated deformation of the leaf springs results in lowering of stress or spring resiliency. Another problem is that the leaf springs are visible at the external surface of eyewear and thus, disrupt esthetic appearance of the eyewear.

Accordingly, it is an object of the present invention to provide a hinge system for eyewear which can urge temples inwardly toward the head of a wearer to better retain the eyewear in the proper position on the wearer.

It is another object of the present invention to provide a hinge system for eyewear which can provide improved appearance and durability.

SUMMARY OF THE INVENTION

According to the present invention, there is provided a hinge system for eyewear with a lens frame and a pair of temples on respective lateral ends of the lens frame. The hinge system includes a pivotable hinge element for connecting one of the temples to a corresponding one of the lateral ends of the lens frame. The pivotable hinge element has one end pivotably connected to the lateral end of the lens frame and another end arranged to allow the temple to be pivotably moved between a wearing position wherein the temple is opened and a folded position wherein the temple is closed. The hinge system also includes a first magnet provided in the lateral end of the lens frame and having a confronting surface, and a second magnet provided in the pivotable hinge element and having a confronting surface. The confronting surfaces of the first and second magnets are arranged to face against each other when the temple is in its wearing position. The confronting surfaces of the first and second magnets have an identical polarity, so that the first and second magnets are operatively associated to urge the temple toward its folded position when the temple is moved to its wearing position.

The first and second magnets have an identical polarity, e.g. north pole. A repulsive force is developed between the first and second magnets when the temple is moved to its wearing position. This repulsive force causes the second magnet to be repelled from the first magnet and thus, urges the temple against the head of a wearer for comfortable and secured fit. Unlike leaf springs, the magnets are durable and easy to maintain. The magnets are arranged in the lateral end of the lens frame and the pivotable hinge element in a confronting relationship. This arrangement enables the magnets to be invisible at the external surface of the eyewear and provides improve appearance.

In one embodiment, the lens frame includes a pair of lugs extending outwardly from the lateral ends of the lens frame, respectively. The pivotable hinge element includes a front section pivotably connected to one of the lugs, and a rear section having one end connected to the front section. The temple is hingedly connected to the other end of the rear section. The pivotable hinge element may have a generally V-shape and include a bent section through which the front and rear sections are connected. The second magnet may be arranged in the rear section of the pivotable hinge element. The lug may include a hole configured to receive the front section of the pivotable hinge element and dimensioned to allow for limited angular movement of the pivotable hinge element. The confronting surface of the first magnet may be substantially flush with adjacent surface of the lug, and the confronting surface of the second magnet may be substantially flush with adjacent surface of the pivotable hinge element.

The lugs may be attached directly to the lenses where the present invention is applied to rimless eyewear.

BRIEF DESCRIPTION OF THE DRAWINGS

The present invention may be best understood by reference to the following description when taken in conjunction with the accompanying drawings in which.

DETAILED DESCRIPTION OF THE INVENTION

Figure 1:
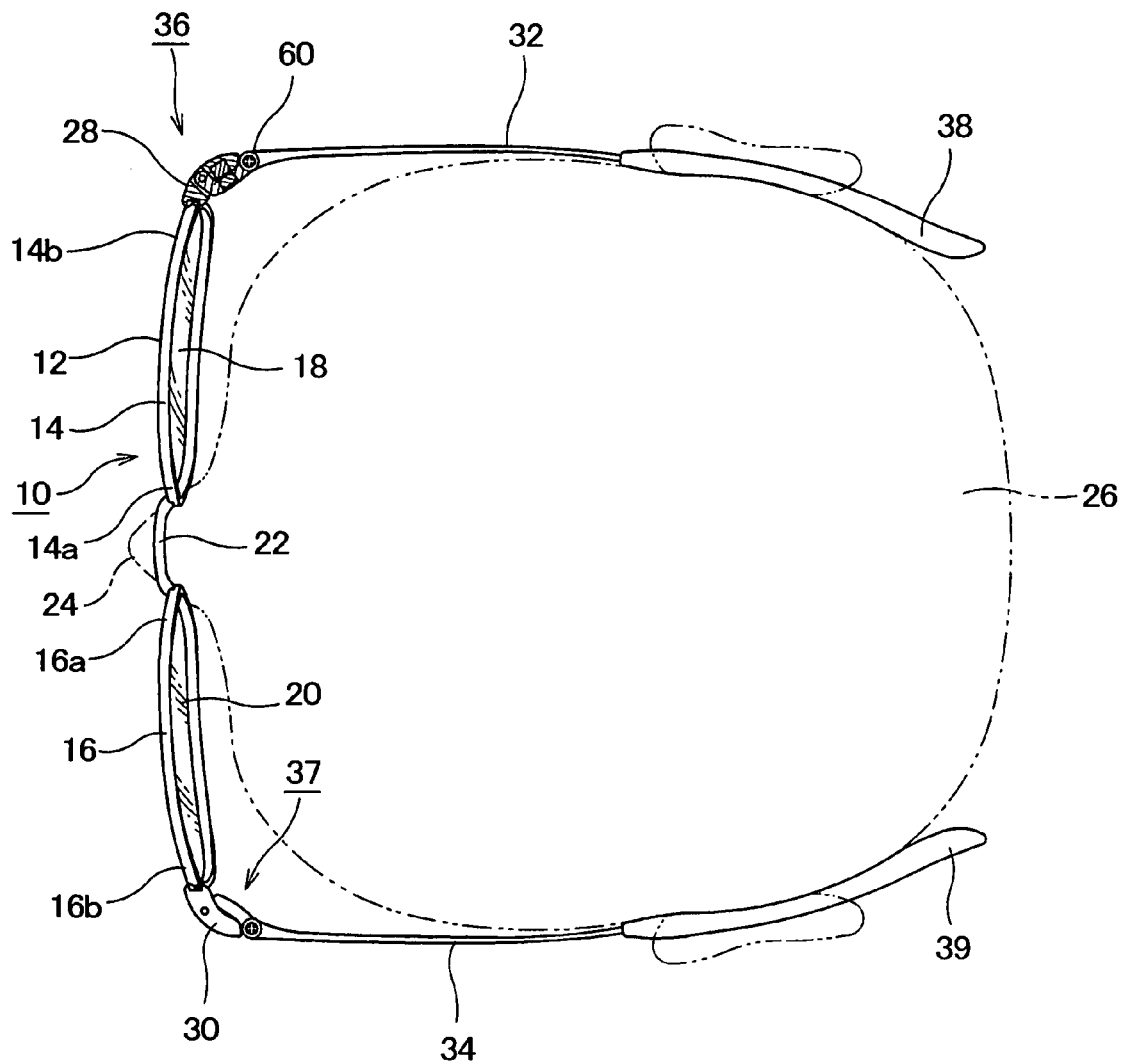
FIG. 1 is a top plan view of eyewear with a hinge system, shown in section, made according to one embodiment of the present invention.
Figure 2:
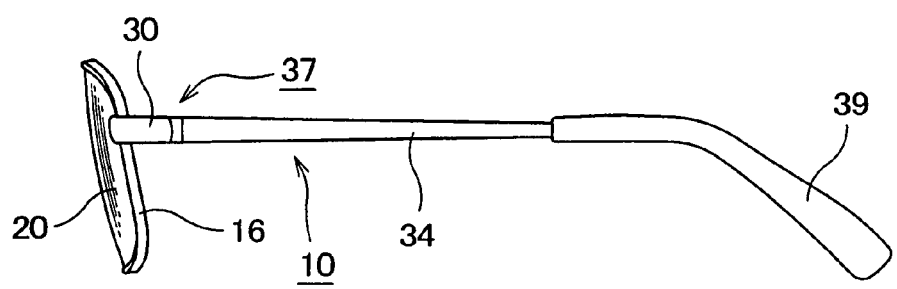
FIG. 2 is a side view of the eyewear shown in FIG. 1.

Referring to FIGS. 1 and 2, there is illustrated eyewear generally designated by reference numeral 10. The eyewear 10 includes a lens frame 12 composed of a pair of rims 14, 16 configured to hold a corresponding pair of lenses 18, 20. The rim 14 has an inner lateral end 14a and an outer lateral end 14b. The rim 16 has an inner lateral end 16a and an outer lateral end 16b. A bridge 22 extends between the inner lateral ends 14a, 16a of the rims 14, 16. Although not shown, a pair of nose pads are connected to the respective rims 14, 16 and rest on a nose 24 of a wearer 26. A pair of frame extensions or lugs 28, 30 are formed integrally with and extend outwardly and rearwardly from the outer lateral ends 14b, 16b of the respective rims 14, 16. A pair of temples 32, 34 are connected at their proximal end to the respective lugs 28, 30 by means of a corresponding pair of hinge systems 36, 37 made according to a preferred embodiment of the present invention. The temples 32, 34 are provided at their distal end with a corresponding pair of earpieces 38, 39 configured to fit behind the ears of the wearer 26.

Figure 4:
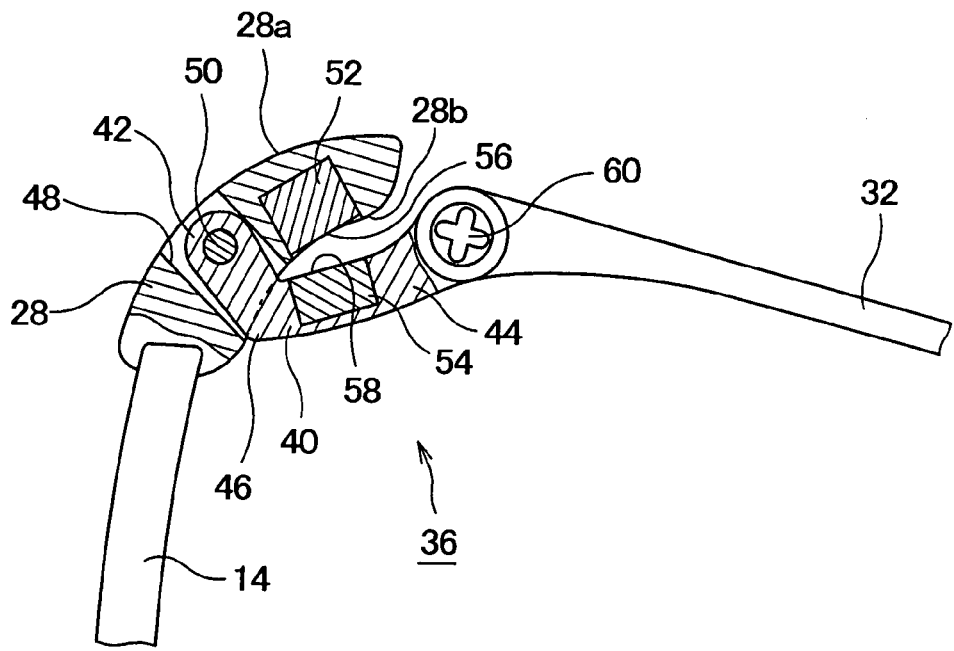
FIG. 4 is a sectional view, on an enlarged scale, of the hinge system shown in FIG. 1, showing that the temple is pivoted from its folded position toward its wearing position.
Figure 5:
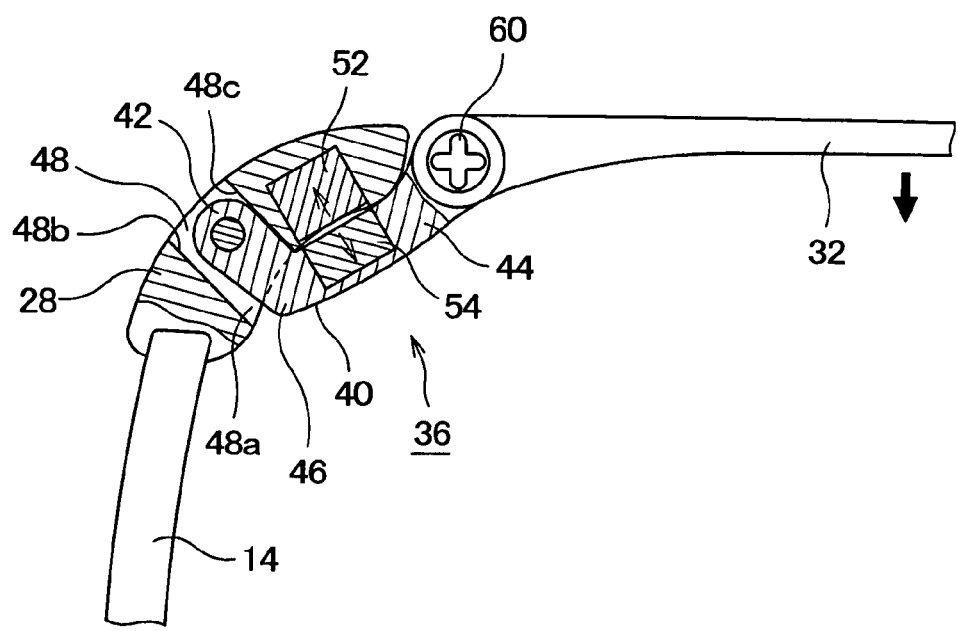
FIG. 5 is a view similar to that of FIG. 4, but showing the manner in which the temple kept in its wearing position is urged against the head of a wearer.

The hinge systems 36, 37 are designed to urge the temples 32, 34 inwardly toward opposite sides of the wearer's head for comfortable and secured fit. In FIGS. 4 and 5, only the hinge system 36 is illustrated in order to simplify the drawings. It is to be understood, however, that the hinge system 37 is a mirror image of the illustrated hinge system 36.

The hinge system 36 includes a pivotable hinge element 40. The hinge element 40 is of a generally V-shape and includes a front section 42 and a rear section 44 connected to the front section 42 via a bent section 46. The lug 28 is slightly arcuate in shape and has a front side 28a and a rear side 28b. A through hole 48 is formed in the lug 28 to receive the front section 42 of the hinge element 40. The hinge element 40 is pivotably connected to the lug 28 by a pivot pin 50. The hole 48 is so dimensioned as to allow for limited angular movement of the hinge element 40. The hole 48 includes a top wall (not seen in FIGS. 4 and 5), a bottom wall 48a and inner and outer side walls 48b, 48c extending between the top and bottom walls. Pivotal movement of the hinge element 40 is limited between the inner and outer side walls 48b, 48c of the hole 48. The inner and outer side walls 48b, 48c of the hole 48 thus serve as stoppers.

Figure 3:
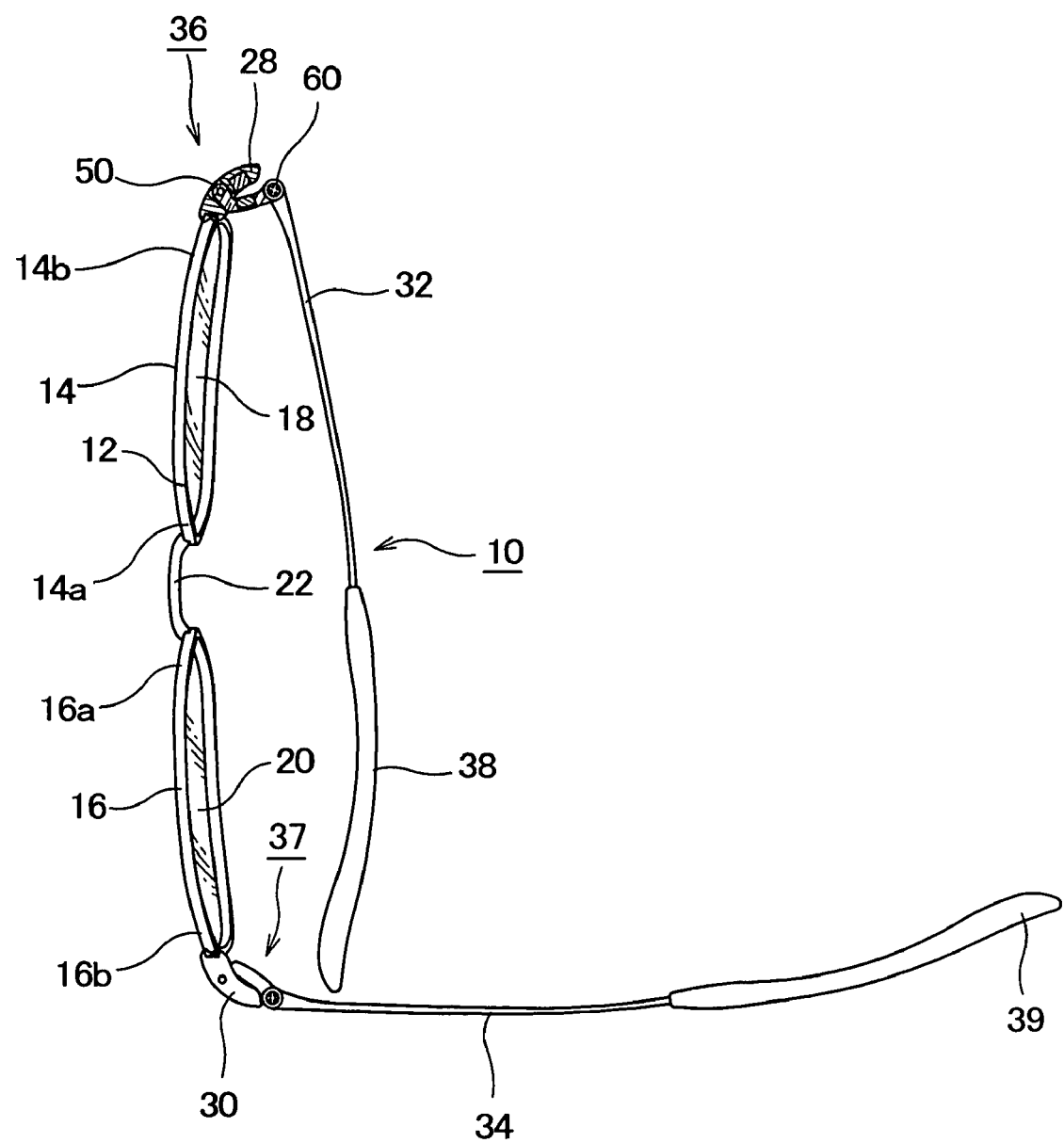
FIG. 3 is a view similar to that of FIG. 1, but showing that one of the temples is in its folded or closed position, and the other temple is in its wearing or open position.

A first permanent magnet 52 is arranged in the outer, free end of the lug 28. A second permanent magnet 54 is arranged in the rear section 44 of the hinge element 40. The first and second magnets 52, 54 include respective exposed confronting surfaces 56, 58 with an identical polarity, for example, north pole. The confronting surface 56 of the first magnet 52 is substantially flush with or slightly projects from adjacent surface of the lug 28. Similarly, the confronting surface 58 of the second magnet 54 is substantially flush with or slightly projects from adjacent surface of the hinge element 40. In the illustrated embodiment, the confronting surfaces 56, 58 are slightly separated from each other when the temple 32 is held in its wearing position as shown in FIG. 5. It is to be understood, however, that the confronting surfaces 56, 58 may be contacted with each other when the temple 32 is held in its wearing position. As shown in FIG. 3, the magnets 52 and 54 are invisible at the outer surface of the eyewear when the temples 32, 34 are in their wearing position. The proximal end of the temple 32 is hingedly connected to the rear section 44 of the hinge element 40 through a hinge pin 60. The temple 32 is pivotably movable between a normal wearing position wherein the temple 32 is opened and extends substantially perpendicular to the plane of the rim 14 (see FIG. 1) and a folded position wherein the temple 32 is closed and lies substantially parallel to the plane of the rim 14 (see FIG. 3).

When the temple 32 is in its folded position, the front section 42 of the hinge element 40 is held in contact with the inner side wall 48b of the hole 48. To wear the eyewear, the temple 32 is outwardly rotated from its folded position toward its wearing position. The hinge element 40 is rotated with the temple 32 to cause the front section 42 of the hinge element 40 to be separated from the inner side wall 48b. The front section 42 of the hinge element 40 is then brought into contact with the outer side wall 48c of the hole 48. At this time, the rear section 44 of the hinge element 40 comes into partial contact with the rear side 28b of the lug 28. The temple 32 is fully opened and moved to its wearing position simultaneously or shortly after the rear section 44 of the hinge element 40 is contacted with the lug 28. With the temple 32 in its wearing position, the confronting surfaces 56, 58 of the first and second magnets 52, 54 are placed in close proximity to each other. As a result, a repulsive force is developed between the first and second magnets 52, 54 as shown by the arrows in FIG. 5. This repulsive force causes the second magnet 54 to be repelled from the first magnet 52. The hinge element 40 is thereby rotated in an inward direction, and the temple 32 is urged against the head of the wearer 26. The degree of a force to be developed to urge the temple 32 can be changed, for example, by increasing and decreasing a ratio between the distance between the pivot pin 50 and the first and second magnets 52, 54 and the distance between the pivot pin 50 and a point where the temple 32 contacts the wearer's head.

In the illustrated embodiment, the lugs are attached to the lens frame. As an alternative, the lugs may be attached directly to the respective lenses where the present invention is applied to rimless eyewear.

Although the present invention has been described with respect to its preferred embodiments, it is to be understood that various modifications and changes may be made without departing from the scope of the invention as claimed.

What is claimed is:

1. A hinge system for eyewear with a lens frame and a pair of temples on lateral ends of said lens frame, said hinge system comprising:

a pivotable hinge element for connecting one of said pair of temples to a corresponding one of said lateral ends of said lens frame, said pivotable hinge element having one end pivotably connected to said lateral end of said lens frame and an other end arranged to allow said temple to be pivotably moved between a wearing position wherein said temple is opened and a folded position wherein said temple is closed;

a first magnet provided in said lateral end of said lens frame and having a confronting surface; and a second magnet provided in said pivotable hinge element and having a confronting surface, said confronting surfaces of said first and second magnets being arranged to face against each other when said temple is in said wearing position, said confronting surfaces of said first and second magnets having an identical polarity, so that said first and second magnets are operatively associated to urge said temple toward said folded position when said temple is moved to said wearing position.

2. The hinge system of claim 1, wherein said lens frame includes a pair of lugs extending outwardly from said lateral ends of said lens frame, respectively, and said pivotable hinge element includes a front section pivotably connected to a corresponding one of said lugs, and a rear section having one end connected to said front section and an other end, said temple being hingedly connected to said other end of said rear section.

3. The hinge system of claim 2, wherein said pivotable hinge element has a generally V-shape and includes a bent section through which said front and rear sections are connected, said second magnet being arranged in said rear section of said pivotable hinge element.

4. The hinge system of claim 2, wherein said lug includes a hole configured to receive said front section of said pivotable hinge element and dimensioned to allow for limited angular movement of said pivotable hinge element.

5. The hinge system of claim 2, wherein said confronting surface of said first magnet is substantially flush with adjacent surface of said lug, and said confronting surface of said second magnet is substantially flush with adjacent surface of said pivotable hinge element.

6. Eyewear comprising:
a lens frame for holding at least one lens;
a pair of temples on lateral ends of said lens frame; and
a hinge system for pivotably connecting said pair of temples to said lateral ends of said lens frame, respectively,
said hinge system including:
a pair of pivotable hinge elements for connecting said pair of temples to said respective lateral ends of said lens frame, said pair of pivotable hinge elements having one end pivotably connected to said respective lateral ends of said lens frame and an other end arranged to allow said pair of temples to be pivotably moved between a wearing position wherein said pair of temples are opened and a folded position wherein said pair of temples are closed;
a pair of first magnets provided in said respective lateral ends of said lens frame and each having a confronting surface; and
a pair of second magnets provided in said pair of respective pivotable hinge elements and each having a confronting surface, said confronting surfaces of said first and second magnets being arranged to face against each other when said pair of temples are in said wearing position, said confronting surfaces of said first and second magnets having an identical polarity, so that said pair of first magnets and said pair of second magnets are operatively associated to urge said pair of temples toward said folded position when said pair of temples are moved to said wearing position.

7. The eyewear of claim 6, wherein said lens frame includes a pair of lugs extending outwardly from said respective lateral ends of said lens frame, and each of said pair of pivotable hinge elements includes a front section pivotably connected to a corresponding one of said lugs, and a rear section having one end connected to said front section and an other end, a corresponding one of said pair of temples being hingedly connected to said other end of said rear section.

8. The hinge system of claim 7, wherein each of said pivotable hinge elements has a generally V-shape and includes a bent section through which said front and rear sections are connected, a corresponding one of said pair of second magnets being arranged in said rear section of said pivotable hinge element.

9. The eyewear of claim 7, wherein each of said pair of lugs includes a hole dimensioned to allow for limited angular movement of a corresponding one of said pair of pivotable hinge elements.

* * * * *

UNITED STATES PATENT AND TRADEMARK OFFICE
CERTIFICATE OF CORRECTION

PATENT NO. : 7,422,323 B2
APPLICATION NO. : 11/809229
DATED : September 9, 2008
INVENTOR(S) : Saitoh et al.

It is certified that error appears in the above-identified patent and that said Letters Patent is hereby corrected as shown below:

Column 1:
    Line 38, change "eyewear and thus, disrupt" to --eyewear, and thus disrupt--.
    Line 56, change "an other" to --another--.
    Line 58, change "wearing position wherein the temple is opened and" to --wearing position, wherein the temple is opened, and--.
    Line 59, change "folded position wherein" to --folded position, wherein--.

Column 2:
    Line 7, change "first magnet and thus, urges" to --first magnet, and thus urges--.
    Line 14, change "improve appearance." to --improved appearance.--.
    Line 29 and line 31, change "flush with adjacent surface" to --flush with the adjacent surface--.
    Line 52, change "the temple kept in its wearing position is" to --the temple, kept in its wearing position, is--.

Column 3:
    Line 37 and line 40, change "projects from adjacent" to --projects from the adjacent--.

Column 4:
    Line 33 and line 54, change "an other" to --another--.
    Line 67, change "flush with adjacent" to --flush with the adjacent--.

Column 5:
    Line 2, change "flush with adjacent" to --flush with the adjacent--.
    Line 15, change "an other" to --another--.
    Line 17, change "position wherein said pair of temples are opened and a" to --position, wherein said pair of temples are opened, and a--.
    Line 18, change "folded position wherein" to --folded position, wherein--.

UNITED STATES PATENT AND TRADEMARK OFFICE
CERTIFICATE OF CORRECTION

PATENT NO.       : 7,422,323 B2
APPLICATION NO.  : 11/809229
DATED            : September 9, 2008
INVENTOR(S)      : Saitoh et al.

It is certified that error appears in the above-identified patent and that said Letters Patent is hereby corrected as shown below:

Column 6:
   Line 12, change "an other" to --another--.

Signed and Sealed this

Twenty-fifth Day of November, 2008

JON W. DUDAS
*Director of the United States Patent and Trademark Office*